United States Patent [19]

Hujsak

[11] Patent Number: 4,635,885
[45] Date of Patent: Jan. 13, 1987

[54] SPACE MANEUVERING VEHICLE CONTROL THRUSTER

[75] Inventor: Edward J. Hujsak, La Jolla, Calif.

[73] Assignee: General Dynamics Corporation/Convair Div., San Diego, Calif.

[21] Appl. No.: 614,202

[22] Filed: May 25, 1984

[51] Int. Cl.⁴ .............................................. B64G 1/26
[52] U.S. Cl. ..................................... 244/169; 244/72; 60/39.463; 60/210; 60/218
[58] Field of Search .............. 244/73 R, 74, 169, 172; 60/39.462, 39.463, 209, 210, 218

[56] References Cited

U.S. PATENT DOCUMENTS

| | | | |
|---|---|---|---|
| 3,097,480 | 7/1963 | John | 244/172 |
| 3,180,084 | 4/1965 | Meeks | 244/172 |
| 3,358,456 | 12/1967 | Lehrer | 60/39.462 |
| 3,446,023 | 5/1969 | Mosier | 60/39.462 |
| 3,514,953 | 6/1970 | Kephart | 60/39.462 |
| 3,673,801 | 7/1972 | Goldberger | 60/218 |
| 4,490,972 | 1/1985 | Ellian et al. | 60/218 |

Primary Examiner—Galen L. Barefoot
Attorney, Agent, or Firm—John R. Duncan; Frank D. Gilliam

[57] ABSTRACT

Disclosed is a single control thruster having the expanded capability of operating at various thrust levels and more than one propellant fluid so that the number of control thrusters for a maneuvering vehicle can be reduced to one third from that now required for appropriate maneuverability in space, resulting in large cost savings and improved reliability. Also disclosed is a "plug in" package with control thruster which can be removed from the vehicle and replaced to make the vehicle easily maintainable.

9 Claims, 5 Drawing Figures

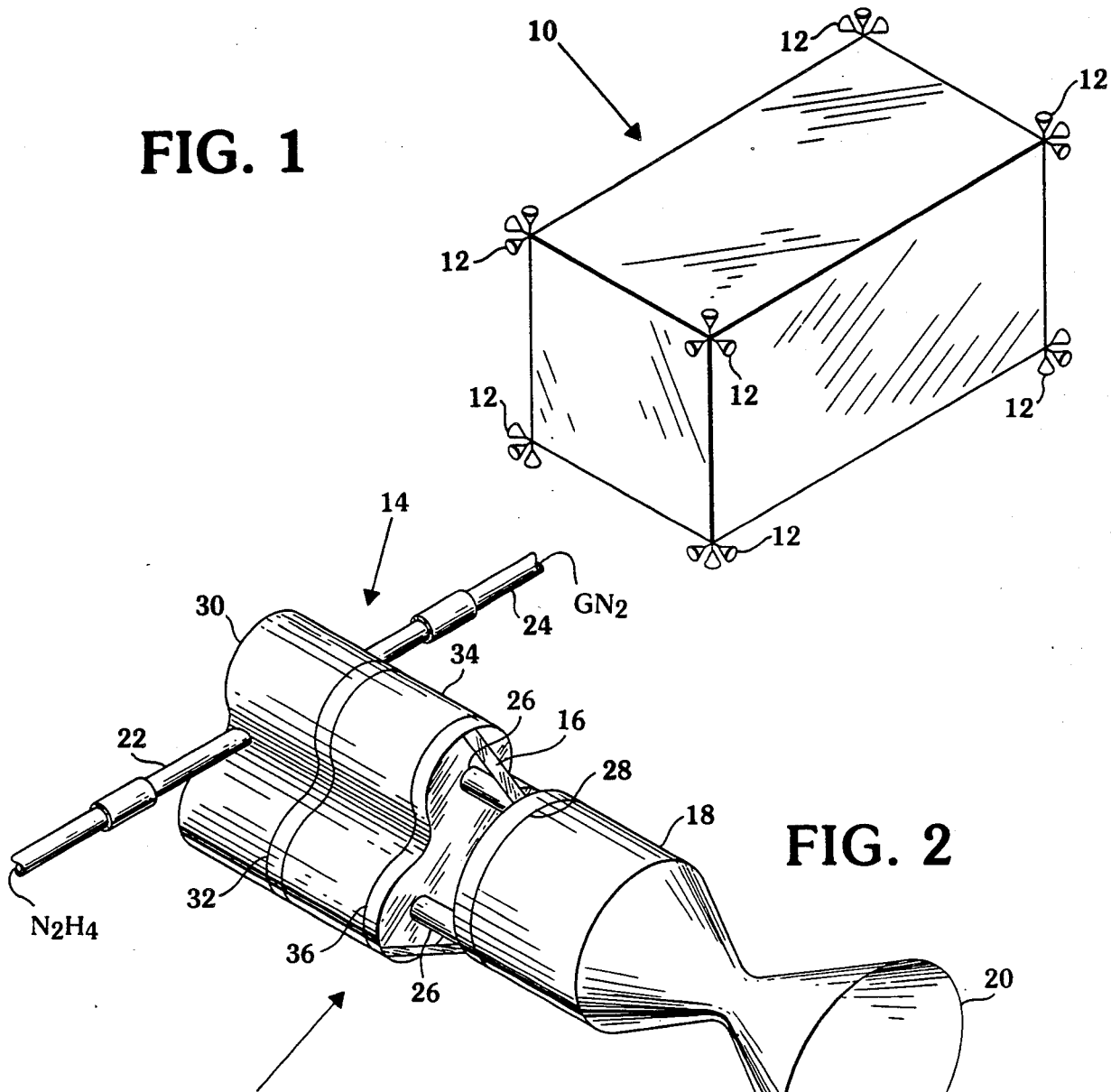
FIG. 1
FIG. 2
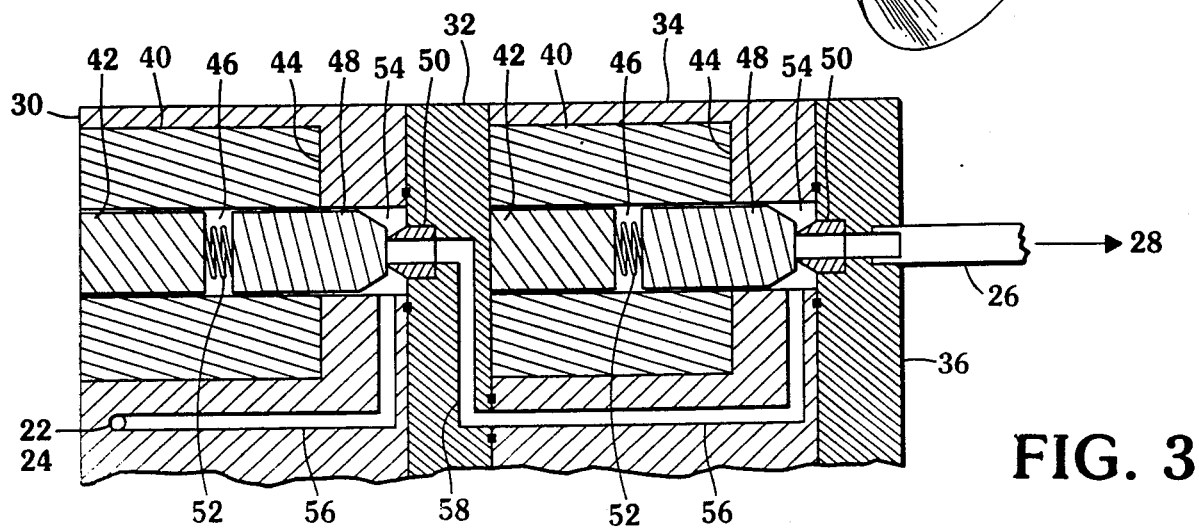
FIG. 3

SPACE MANEUVERING VEHICLE CONTROL THRUSTER

BACKGROUND OF THE INVENTION

This invention relates to the control of maneuvering vehicles that operate in space and specifically relates to new and improved thrusters for such devices.

A space maneuvering vehicle is a specialized spacecraft, sometimes referred to as an orbit maneuvering vehicle (OMV), with propulsion capacity that is capable of retrieving other spacecraft, for servicing by a space shuttle orbiter or space station in low earth orbit, of placement of spacecraft into low earth orbits but at altitudes higher than the space shuttle orbiter is capable of reaching, and of docking of spacecraft in order to accomplish servicing tasks; all by remote control or through fully automated techniques.

To accomplish this, maneuvers in close proximity to spacecraft, including closing maneuvers and docking, the vehicle will be controlled by low level thrusters operating in conjunction with the vehicle's guidance and navigation system, under control of an operator situated at a ground based or space based control situation. For full control (6° of freedom) a total of 24 thrusters are required located on the vehicle in the geometry approximately as depicted in FIG. 1; FIG. 1 being simply a parallelpiped representing the vehicle with groups of three thrusters, 12 fanning out from the eight corners of the vehicle.

However, there are complicating factors that can cause the requirement for thrusters to go up by a factor of three, to a possible total of 72.

First, for remote control of the maneuvering vehicle by a shuttle or earth-stationed operator, ie., manual control, a high level of thrust is desired in order that maneuvers can be accomplished in reasonable periods of time. This thrust level may be, for example 15 lbs per thruster. Second, however, when the maneuvering vehicle operates autonomously, ie, automatically, significant fuel savings can be effected if the control thrusters operate at a lower level, for example, 5 lbs of thrust per thruster. Normally, automated operations can take longer using less to accomplish than those that are under manual control. The importance of saving fuel is recognized due to the high cost of transportation to earth orbit; on the order of $1000 per pound. So propellant conservation is the resultant benefit from operating at a lower thrust level.

Lastly, when a maneuvering vehicle operates in close proximity to a spacecraft, the exhaust plume from the control thrusters is a source of contamination or possible damage to sensitive parts or to surfaces. It is therefore desirable to use an inert gas for thrusting when in close proximity to spacecraft.

So for these three possible modes of operation of a teleoperator, the following requirement arises for control thrusters:

|  |  | Thrust Level | No. Req. |
|---|---|---|---|
| Mode 1- | Manual remote control maneuvering vehicle | 15 lbs | 24 |
| Mode 2- | Automated control maneuvering vehicle | 5 lbs | 24 |
| Mode 3- | Close proximity | 1 lb | 24 |

Therefore, an object of this invention is to eliminate the need for a large number of control thrusters on a maneuvering vehicle yet maintain the performance capability thereof. More specifically, it is an object of this invention to reduce the requirement of control thrusters on a maneuvering vehicle from a possible 72 to a total of 24.

Still another object of this invention is to provide control thrusters for the vehicle which are easily removable from the vehicle and replaceable, to make the vehicle easily maintainable.

SUMMARY OF THE INVENTION

The foregoing object of the invention is accomplished by expanding the capability of a single thruster so that it can operate at various levels. The control thruster of this invention is capable of operating at two thrust levels when chemically fueled and at a third level when fueled with an inert gas. In one embodiment, the control thrusters are in a "plug-in" package by which the control thrusters can be easily removed from and replaced in a vehicle for easy maintenance of the vehicle.

BRIEF DESCRIPTION OF THE DRAWINGS

FIG. 1 illustrates, as described above, the geometric arrangement of thrusters on a maneuvering vehicle;

FIG. 2 is a perspective view of a reaction control thruster for a maneuvering vehicle constructed in accordance with the teachings of this invention;

FIG. 3 is a schematic diagram of a series redundant solenoid actuated fluid valve forming part of the thruster of FIG. 2;

DETAILED DESCRIPTION OF THE DRAWINGS

Figure 4:
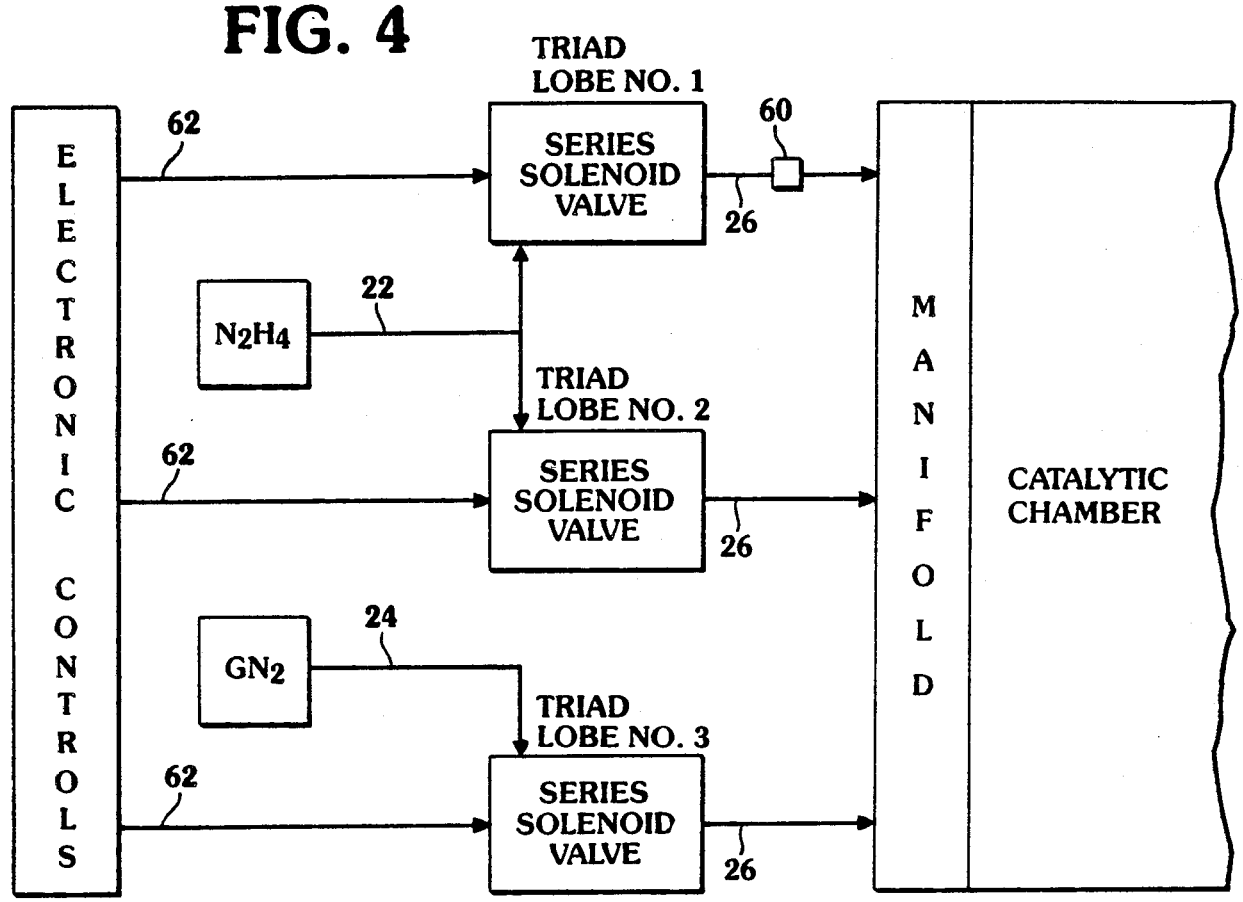
FIG. 4 is a schematic illustration of the control and distribution of fuel in the thruster.

As mentioned before, FIG. 1 illustrates the location of the control thrusters 12 on a maneuvering vehicle 10 represented by a parallelpiped.

Turning now to FIG. 2, there is illustrated one control thruster 12 constructed according to this invention and comprising a three-lobed valve housing 14, connected via a thruster support (brackets) 16 to a catalytic thrust chamber 18 and thrust exhaust cone 20. The three-lobed valve housing 14 is provided with an inlet pipe 22 for connection to a supply of hydrazine and a second inlet pipe 24 for connection to a supply of inert gas and three outlet pipes 26 which are connected to a manifold 28 of the catalytic thrust chamber.

The three-lobed valve housing 14 is actually formed of lobed triads containing fluid passages and valving in each lobe for the three separate modes of operation of the thruster. Thus, the housing end is a first solenoid triad 30 separated by a valve seat wafer 32, from a second solenoid triad 34 and capped by a second valve seat wafer 36 to which the above mentioned thruster support 16 is connected and from which the outlet pipes 26 extend. The details of the series connected solenoid actuated valves in one lobe is illustrated in FIG. 3 to which attention is now directed.

The schematic diagram comprising FIG. 3 shows that the first solenoid triad 30 encloses a solenoid 40 and its core 42 in a counterbore 44 forming an enlargement of a centerbore 46 which contains a slideable poppet 48 which is urged toward a valve seat 50 by a spring 52 thus forming a normally closed valve in a valve chamber 54. The triad is also provided with a fluid passage 56 connected at one end to one of the fluid inlets 22 or 24 that is to hydrazine or the inert gas and which opens into the valve chamber 54 normally closed by the valve poppet. In contact with the solenoid triad 30 is the valve seat wafer 32 which is bored to contain the valve seat 50 shown extending into the valve chamber 54 and which is provided with an outlet passage 58 which connects to a fluid passage 56 in the second solenoid triad 34. The function of the components of the second solenoid triad 34 and valve seat wafer 36 are similar to the function of the components of the first solenoid and valve seat triad and wafer and are thus given the same reference numerals except that the valve chamber 54 of the second solenoid triad 34 opens into the fluid outlet pipe 26 for connecting the fluid to manifold 28.

Thus, within each lobe of the valve housing are two solenoid operating valves arranged to operate in series as a redundancy for the purpose of assuring thruster shut downs in the event of valve failure. The inert gas, which may be nitrogen or helium, but usually nitrogen, is directed to the inlet port 24 of one of the lobes, while hydrazine is directed to the ports of the other two lobes. The exit of each lobe leaves via the outlet pipes 26 to the inlet manifold 28. One of the outlet pipes is orificed (restricted) as at 60 in or before the manifold to control the flow of hydrazine from one of the lobes so that the thruster will operate at either one or two thrust levels depending upon which lobe is activated by the system controls. The inert gas solenoids for the flow of inert gas are operated only when the hydrazine solenoids are deactivated as would be the case for spacecraft proximity maneuvering. This is illustrated schematically in FIG. 4. This figure also shows the electrical connections 62 between the solenoid valves and the electronic controls.

While the redundant solenoid valves, as such, are old in the catalytic thruster art, it is their arrangement in a three-lobed housing and the logic of their operation for three level thrust operation which provides the means by which the number of control thrusters for a maneuvering vehicle can be reduced to one third, resulting in large cost savings and improved reliability.

Figure 5:
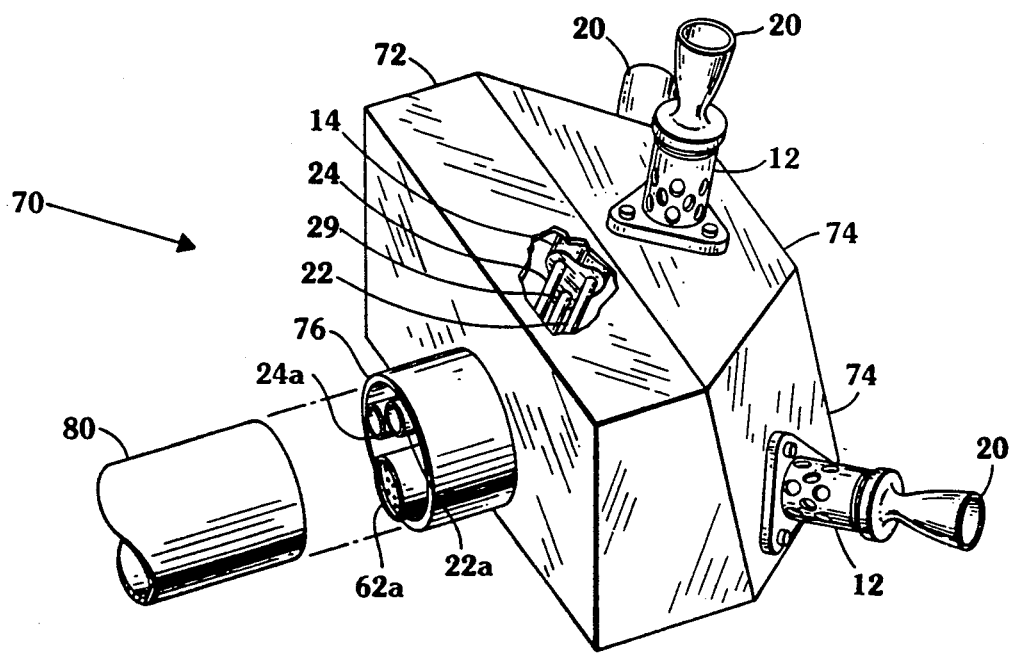
FIG. 5 is a perspective view of an arrangement of a package of three thrusters used at each corner of the geometric arrangement of FIG. 1.

Turning now to FIG. 5, there is shown a "plug-in" type of package 70 with a cluster of three control thrusters 12. This package permits the three control thrusters located at each corner of the maneuvering vehicle 10, such as shown in FIG. 1, to be easily removed and replaced, either manually or by robotics for easy maintenance of the vehicle. The package comprises a housing 72 with three walls 74 on which the three thrusters 12 are mounted at the desired angle. At the side opposite the thrusters, there is a locking sleeve 76 which encloses a hydrazine disconnect coupling 22a, a gaseous coupling 24a, and an electrical disconnect coupling 62a by which the fuel and electrical connections for the thrusters are attached and detached from, for example, a mounting post 80 which contains the fuel and electrical lines and which is attached to the vehicle. One or more of the walls of the housing 72 are, of course, removable for access to the fuel and electrical lines within the housing.

What is claimed is:

1. In a maneuvering vehicle, control thrusters for maneuvering the vehicle in space, each of said control thrusters having a catalytic chamber and a thrust outlet and further including,
    a valve housing with a plurality of pairs of series valves therein, and
    means for controlling said valves of said pairs wherein thrust material introduced into the catalytic chamber from the pairs of series valves is varied in type and amount, at least one of said types being an inert gas so that the control thruster will operate at different thrust levels.

2. The control thrusters as claimed in claim 1 wherein said valve housing encloses three sets of series connected valves each with two inlet ports and one outlet port.

3. The control thrusters as claimed in claim 2 wherein one of said inlet ports is connected to a supply of catalytic fuel and the other inlet port is connected to a supply of inert gas, and wherein said control means actuates said valves to direct the catalytic fuel of a selected first amount out one of said outlet ports and catalytic fuel of a second amount out another of said outlet ports and the inert gas out a third outlet port to vary the thrust output of said thruster.

4. The control thrusters as claimed in claim 3 wherein said control means includes a reduced flow restrictive device in one of said outlet ports.

5. The control thrusters as claimed in claim 4 wherein said control thrusters are arranged in groups of three, a housing containing said thrusters, and means in said housing for connecting and disconnecting said inlet ports to and from said catalytic fuel and inert gas.

6. A control thruster for a maneuvering vehicle including an outlet cone,
    a catalytic chamber connected to said outlet cone,
    a lobed housing connected to said catalytic chamber,
    a first inlet port connecting two lobes of said housing to a supply of catalytic fuel,
    a second inlet port connecting another lobe of said housing to a supply of inert gas,
    means in said thruster to control the output of catalytic fuel to said catalytic chamber to vary the thrust level of said thruster, and
    means in said thruster to control the output of inert gas to said catalytic chamber to vary the thrust level of said thruster.

7. The control thruster as claimed in claim 6 wherein said control means for said catalytic fuel includes a reduced flow restriction between one lobe output and the catalytic chamber so that the fuel amount is reduced from that output from the other lobe which directs the catalytic fuel to the catalytic chamber.

8. The control thruster as claimed in claim 7 further including disconnect means for connecting and disconnecting said inlet ports to and from said supplies for ease of replacement of said thrusters.

9. The control thrusters as claimed in claim 7 wherein said thrusters are clustered in groups of three, and further including a housing for said thrusters and means for quickly connecting and disconnecting said thrusters from said supplies.

* * * * *